(12) United States Patent
Raddino et al.

(10) Patent No.: US 12,206,249 B2
(45) Date of Patent: Jan. 21, 2025

(54) METHOD AND SYSTEM FOR OPERATING AN INTERNET-OF-THINGS (IOT) DEVICE

(71) Applicant: Rohde & Schwarz GmbH & Co. KG, Munich (DE)

(72) Inventors: Daniela Raddino, Munich (DE); Lilei Wang, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 13 days.

(21) Appl. No.: 18/323,269

(22) Filed: May 24, 2023

(65) Prior Publication Data

US 2024/0396369 A1    Nov. 28, 2024

(51) Int. Cl.
*H02J 50/00* (2016.01)
*H04W 72/50* (2023.01)

(52) U.S. Cl.
CPC .......... *H02J 50/001* (2020.01); *H04W 72/50* (2023.01)

(58) Field of Classification Search
CPC ...... H02J 50/001; H04W 72/12; H04W 72/50

USPC .......................................................... 307/104
See application file for complete search history.

(56) References Cited

U.S. PATENT DOCUMENTS

2015/0363614 A1    12/2015  Yeager et al.
2023/0031981 A1*   2/2023   Yehezkely .............. H02J 50/80

FOREIGN PATENT DOCUMENTS

WO    2022/131984 A1    6/2022
WO    2023/287346 A2    1/2023

* cited by examiner

*Primary Examiner* — Hal Kaplan
(74) *Attorney, Agent, or Firm* — CHRISTENSEN O'CONNOR JOHNSON KINDNESS PLLC

(57) ABSTRACT

Embodiments of the present disclosure relate to a method of operating an internet-of-things (IoT) device. An internet-of-things device with an energy storage is provided. At least one energy harvest window for the internet-of-things device is provided during which energy provided by the network device is stored in the energy storage in a wireless manner. The energy harvest window takes place before a discontinuous reception time window and/or before a paging occasion. Moreover, a system for operating an internet-of-things (IoT) device is described.

18 Claims, 3 Drawing Sheets

METHOD AND SYSTEM FOR OPERATING AN INTERNET-OF-THINGS (IOT) DEVICE

FIELD OF THE DISCLOSURE

Embodiments of the present disclosure relate to a method of operating an internet-of-things (IoT) device. Further, embodiments of the present disclosure relate to a system for operating an internet-of-things (IoT) device.

BACKGROUND

In modern telecommunication standards like 5G-A/6G, so-called Zero-Power internet-of-things (ZP-IoT) devices are suggested that do not require a steady energy source for operation, which might have to be replaced after some time. In other words, those devices may be battery-less and cordless.

Accordingly, the Zero-Power internet-of-things devices shall obtain the necessary energy required for operations from other nearby devices that may communicate with the respective IoT devices, for instance by using Bluetooth or Wi-Fi. Specifically, the respective Zero-Power internet-of-things devices shall receive energy from the other nearby device, namely by signals that are radiated by the other nearby device and received by the respective IoT devices.

Once a signal is radiated and received by the IoT device, the IoT device will convert the signal received in order to store energy that can be used internally by the IoT device at least for certain operations, for instance communication purposes.

However, it has been identified that the efficiency of the Zero-Power internet-of-things devices has to be increased in order to ensure proper operation of the respective device.

Accordingly, there is a need for a method and system for operating an internet-of-things (IoT) device, which ensure efficient operation of the internet-of-things device, particularly the Zero-Power internet-of-things device (ZP-IoT device).

SUMMARY

Embodiments of the present disclosure provide a method of operating an internet-of-things (IoT) device. In an embodiment, the method comprises the steps of: providing an internet-of-things device with an energy storage, and providing at least one energy harvest window for the internet-of-things device during which energy provided by a network device is stored in the energy storage in a wireless manner. In certain embodiments, the energy harvest window takes place before a discontinuous reception (DRX) time window and/or before a paging occasion (PO).

Further, embodiments of the present disclosure provide a system for operating an internet-of-things (IoT) device. In an embodiment, the system comprises a network, a network device and an internet-of-things device with an energy storage. The network is configured to define at least one energy harvest window for the internet-of-things device during which energy provided by the network device is stored in the energy storage in a wireless manner. In certain embodiments, the energy harvest window takes place before a discontinuous reception (DRX) time window and/or before a paging occasion (PO).

Generally speaking, the main idea of the present disclosure is to increase the efficiency of the operation of the internet-of-things (IoT) device by defining the at least one energy harvest window to be used for charging the IoT device, for example its energy storage. Thus, it is not necessary that a charging module of the IoT device is always on, thereby causing power consumption which reduces the efficiency. Moreover, the lifetime of the IoT device can be increased due to the fact that the operation time of the charging module is significantly reduced since charging takes only place during the at least one energy harvest window rather than continuously. In other words, a resource crowding can be avoided effectively.

In some embodiments, it can be avoided that any signal transmission over the air activates the charging module of the IoT device, which is the case if the charging module is always activated.

Generally, discontinuous reception (DRX) time windows relate to a mechanism that ensures power saving and load balancing. In some embodiments, several IoT devices may wake up and sleep in different time slots.

Generally, the paging occasions relate to a paging procedure which reduces a latency of a service during the sleep time.

In some embodiments, the IoT device only turns on its charging module during the at least one energy harvest window, thereby reducing the energy consumption significantly. In other words, the charging module of the IoT device is deactivated during time periods being different from the at least one energy harvest window.

An aspect provides that the at least one energy harvest window is provided by, for example, a network to which the internet-of-things device and the network device are connected. The network may be a wireless local area network or any other kind of wireless network. The network may monitor charging occasions of IoT devices within the network or discontinuous reception time windows and/or paging occasions for the IoT devices within the network in order to define the at least one energy harvest window appropriately. For instance, the network device itself may define the at least one energy harvest window by monitoring the IoT devices, for example their behavior.

In some embodiments, the IoT device may communicate an identification (ID) based on which the network (device) is enabled to calculate paging occasion(s) and, therefore, the at least one energy harvest window.

Another aspect provides that the at least one energy harvest window is defined by, for example, duration, bandwidth, frequency and/or power. Therefore, different parameters may be used for defining the at least one energy harvest window. In case of more than one energy harvest window, the energy harvest windows may be defined based on different parameters and/or different values of the same parameters. In other words, different energy harvest windows may be defined by adapting the parameters appropriately, e.g. the respective values of the parameters. Thus, it can be ensured that the energy harvest windows are modified according to the needs of the IoT devices within the network.

Generally, at least two different kinds of energy harvest windows may be provided. These kinds of energy windows may relate to the subsequent operations of the IoT device, namely the discontinuous reception (DRX) time window or the paging occasion. As mentioned above, the energy harvest windows may differ from each other by at least one of the above-mentioned parameters, namely duration, bandwidth, frequency and/or power, and/or the respective value of these parameters, e.g. a different duration or a different power.

In other words, the different kinds of energy harvest windows may be different with regard to duration, bandwidth, frequency and/or power. Thus, it is ensured that the respective needs of the IoT device can be satisfied. Actually, it is ensured that only the energy required is obtained, thereby improving the overall efficiency and the lifetime of the IoT device, e.g. its charging module.

In some embodiments, a first kind of energy harvest window takes place before the discontinuous reception time window, whereas a second kind of energy harvest window takes place before the paging occasion. The required energy may be different for the subsequent operations that take place, namely the reception operation during the subsequent discontinuous reception time window as well as the paging activity during the subsequent paging occasion. The discontinuous reception time window may be longer than the paging occasion in time domain such that the respective energy harvest window taking place before has to be adapted appropriately in order to ensure that the IoT device is sufficiently charged with energy such that the IoT device is capable of performing the respective operation during the discontinuous reception time window and/or the paging occasion.

Moreover, resources in frequency domain may also be different with regard to the discontinuous reception time window at the paging occasion.

Generally, the different kinds of energy harvest windows provide flexibility in order to optimize the overall system accordingly.

A further aspect provides that the at least one energy harvest window takes place, for example, immediately before the discontinuous reception time window and/or immediately before the paging occasion such that the at least one energy harvest window depends on the discontinuous reception time window and/or the paging occasion. In other words, the IoT device is charged immediately before the subsequent operation of the IoT device takes place. In other words, the energy harvesting performed during the at least one energy harvest window is tightly combined with an active time of the IoT device, namely right before the discontinuous reception time window and the paging occasion.

Moreover, the network (device) may recognize a certain pattern of the IoT device with regard to its operations such that it is easy to adapt the energy harvest windows in time domain with respect to the discontinuous reception time windows and the paging occasions.

According to another aspect, the at least one energy harvest window is, for example, independent of the discontinuous reception time window and/or the paging occasion. Thus, the at least one energy harvest window does not necessarily take place immediately before the discontinuous and the paging occasion. In some embodiments, it is not tightly bound. Therefore, the position of the at least one energy harvest window in time domain can be altered with regard to the discontinuous reception time window and the paging occasion.

In some embodiments, a pause takes place between the at least one energy harvest window and the discontinuous reception time window and/or between the at least one energy harvest window and the paging occasion. Thus, the IoT device has a pause between its charging and its operation (active time).

In some embodiments, the timing and the occasion of the at least one energy harvest window may be defined based on a formulation of a discontinuous reception cycle of the IoT device, an identification of the IoT device, a number of total charging frames in a cycle, a number of charging occasions for a charging frame and/or an offset used for charging frame determination. The respective formulation may be obtained by the following.

SFN for the paging frame ("PF") is determined by:

(SFN+PF_offset) mod T=(T div N)*(UE_ID mod N), wherein index (i_s), indicating the index of the paging occasion, is determined by i_s=floor (IoT_ID/N) mod Ns. T: DRX cycle of the IoT device, IoT_ID: 5G-S-TMSI mod 4096 or 5G-S-TMSI mod 1024, N: number of total PF in T, Ns: number of paging occasions for a PF, and PF_offset: offset used for PF determination.

Based thereon, SFN for the charging frame ("CF") is determined by:

(SFN+CF_offset) mod T'=(T' div N')*(UE_ID mod N'), wherein Index (i_s'), indicating the index of the charging occasion, is determined by: i_s'=floor (IoT_ID/N') mod Ns', T'=T, DRX cycle of the IoT device, IoT_ID: 5G-S-TMSI mod 4096 or 5G-S-TMSI mod 1024, N': number of total charging frames in T', Ns': number of charging occasions for a CF, and CF_offset: offset used for CF determination.

According to a further aspect, the at least one energy harvest window for the internet-of-things device is, for example, shorter than an energy transmission window of the network device. The network device may provide energy for several IoT devices such that the respective energy harvest window for the internet-of-things device may be shorter than the energy transmission window since several IoT devices are charged subsequently. Put differently, the energy transmission window of the network device relates to the accumulation of several energy harvest windows for the internet-of-things devices, wherein the several energy harvest windows may at least partly overlap or take place subsequently.

In addition, the IoT device has, for example, a communication circuit with a transmission part and/or a reception part. The communication circuit may be used for communication with the network device. Moreover, the transmission part may comprise a backscatter processor or a transmitter. The reception part may comprise a receiver, for example including a radio frequency component and/or a baseband component.

In some embodiments, the signal of the network device may be received via the reception part of the communication circuit or a separately formed reception antenna. The signal received is converted into electrical energy that is stored in the energy storage of the IoT device.

In some embodiments, the communication circuit has a clock that is capable of synchronizing the IoT device to the at least one energy harvest window. As discussed above, the at least one energy harvest window is defined via the network (device) in time domain. A synchronization is necessary in order to ensure that the IoT device, for example its charging module, wakes up during the energy harvest window such that it can receive and process the signal for charging the IoT device.

A further aspect provides that the IoT device has a sensor that is coupled, for example, to the communication circuit. The sensor may be an environmental sensor, e.g. a temperature sensor or a humidity sensor, which is able to sense an environmental parameter of the IoT device, for instance temperature and/or humidity. The respective information sensed may be transmitted by the IoT device, for example to the network device.

As discussed before, the energy necessary for the respective operation, e.g. the transmission of the information sensed, may be gathered during the at least one preceding energy harvest window during which the IoT device is charged.

In general, the energy stored may be sufficient for a subsequent transmission done by the IoT device. This ensures that the IoT device can be operated effectively, as the energy obtained during the at least one energy harvest window is sufficient for the subsequent transmission done by the IoT device, e.g. a transmission of an environmental parameter sensed.

In some embodiments, the energy storage may be a capacitor or a battery. The battery may be a low voltage battery that is sufficient for the subsequent operation of the IoT device.

In some embodiments, the network device may be a base station. The base station can communicate with several IoT devices. Furthermore, the base station may establish the network.

In some embodiments, the duration of the discontinuous reception time window may be equal to the time duration of the paging occasion. Alternatively, the time duration of the discontinuous reception time window and the time duration of the paging occasion may be different.

An aspect provides that the internet-of-things device and the network device are, for example, embedded in the network such that the network device is configured to transmit a signal via the network to the internet-of-things device that is configured to receive the signal. The respective signal may be a power signal that is used for charging the internet-of-things device.

In some embodiments, the network device defines the at least one energy harvest window and sends the (power) signal during that window.

In some embodiments, the IoT device may be an electric label used in a supermarket, an electric label in warehouse/logistics, a device in a smart home application, a card reader or a scanner, e.g. a device communicating with another device, for example the network device.

In some embodiments, the IoT device is a device that obtains energy by harvesting different energy sources, for example the network device.

In some embodiments, the network device may transmit a signal with a power less than 100 mW which enables operation of the IoT device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
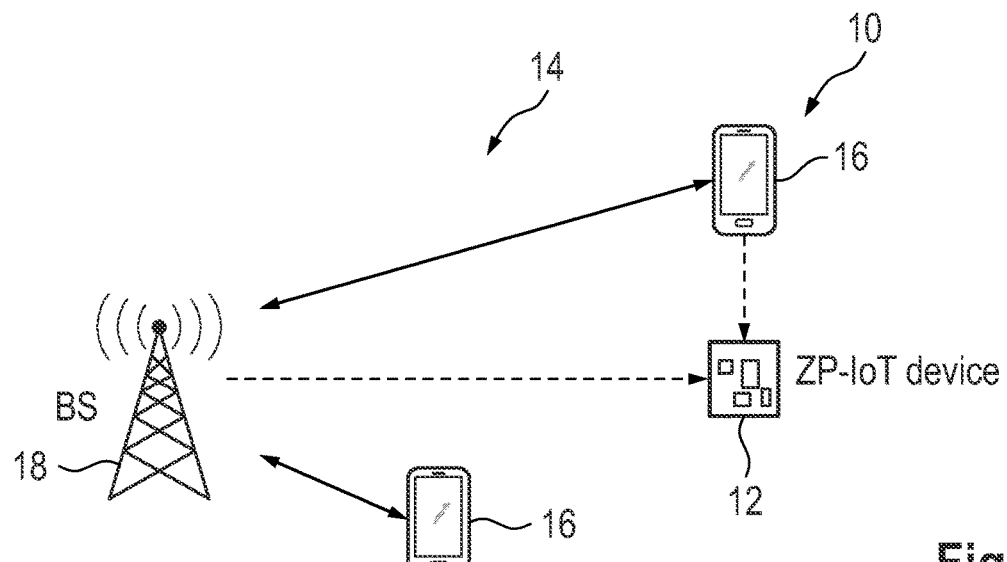
FIG. 1 schematically shows an overview of a system according to an embodiment of the present disclosure, FIG. 2 schematically shows a schematic overview of an internet-of-things device used in the system of FIG. 1, FIG. 3 schematically shows an overview illustrating a representative method of operating an internet-of-things device according to a first embodiment of the present disclosure, and FIG. 4 schematically shows an overview illustrating a representative method of operating an internet-of-things device according to a second embodiment of the present disclosure.

FIG. 1 illustrates an example of a system 10 for operating an internet-of-things (IoT) device 12, wherein the IoT device 12 is a zero power internet-of-things device (ZP-IoT device). As shown in FIG. 1, the system 10 comprises a network 14, further IoT devices 16 as well as a network device 18, e.g. a base station. The network device 18, e.g. the base station, may establish the network 14 for connection with the IoT device 12 and the further IoT devices 16.

Figure 2:
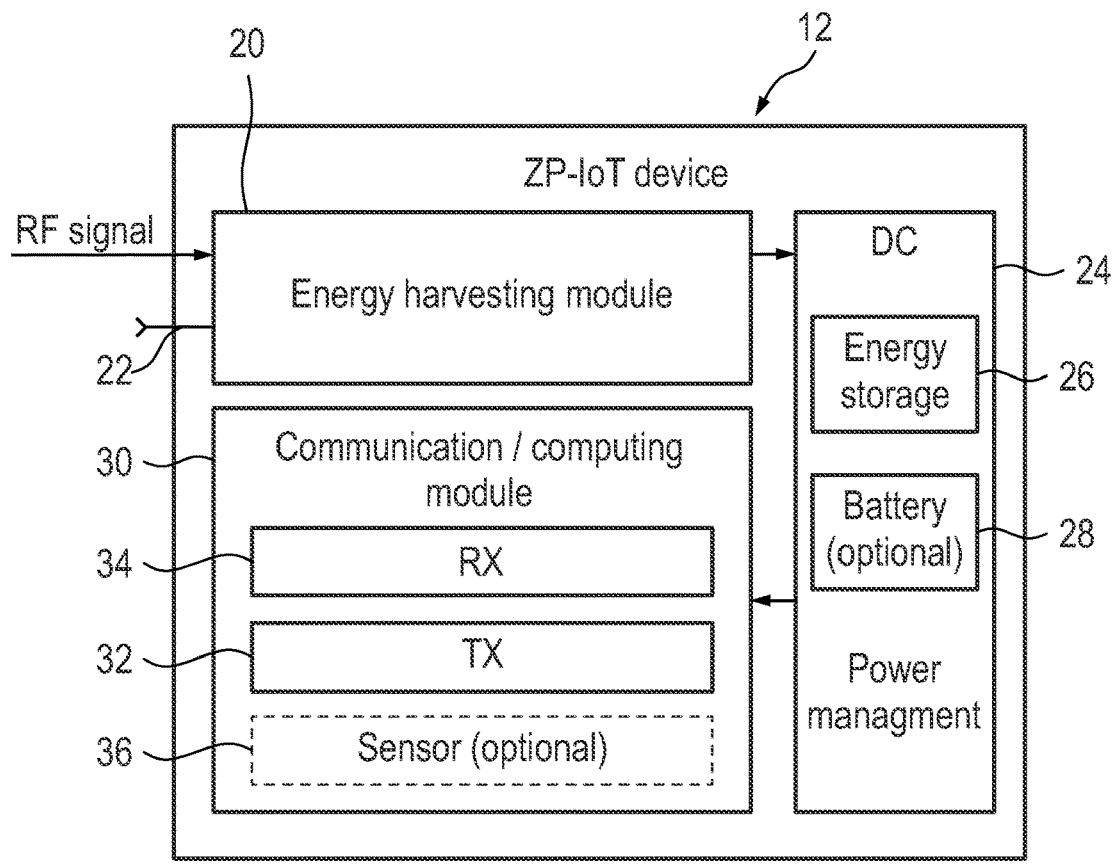

An example of the IoT device 12 is shown in more detail in FIG. 2. In the embodiment shown in FIG. 2, the IoT device 12 comprises a charging module 20, also called energy harvesting module. The charging module 20 may be connected to a reception antenna 22 for receiving a signal, e.g. a radio frequency (RF) signal. The respective signal may be transmitted by the network device 18.

The charging module 20 is connected with a storage circuit 24 that comprises an energy storage 26, e.g. a capacitor. In addition, an additional battery 28 may be provided as a further energy storage. Accordingly, two different kinds of energy storage are provided.

In some embodiments, the energy circuit 24 comprises a power management functionality that is used for managing the energy stored in the energy storage 26. In some embodiments, the energy circuit 24 includes charging circuitry for charging the energy storage 26 and or battery 28 with energy received by the charging module 20.

Generally, the charging module 20 includes circuitry configured to convert the RF signal to a direct current (DC) signal used for charging the energy storage 26. For instance, the charging module 20 comprises a rectifier circuit. The energy storage 26 is used to store the energy obtained from converting the RF signal.

In some embodiments, the IoT device 12 also comprises a communication module 30 that is connected with a transmission part 32 ("TX"), for instance a transmitter or a backscatter processor. The communication module 30 may also be connected with a reception part 34 ("RX"). The reception part 34 may comprise radio frequency components and/or a baseband component. Generally, the transmission part 32 ("TX") and the reception part 34 ("RX") may be used for communication purposes of the IoT device 12.

In some embodiments, a sensor 34 (optional) may be provided that is connected with the communication module 30. The sensor 34 is configured to sense at least one environmental parameter of the IoT device 12, e.g. temperature and/or humidity.

Figure 3:
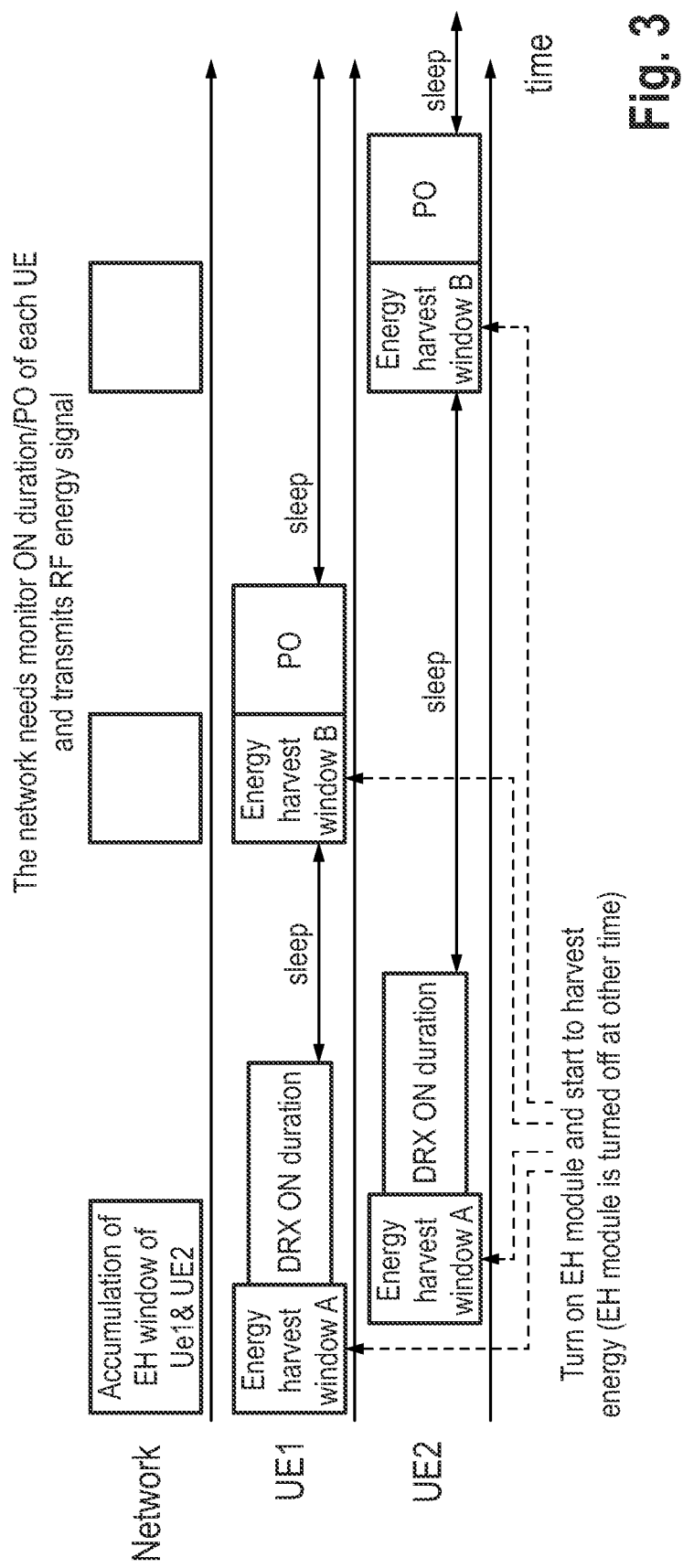

In FIG. 3, operation of the system 10 of FIG. 1 is shown in more detail, as the network 14 defines energy harvest windows for the IoT device 12. In the shown embodiment of FIG. 3, two different IoT devices 12, labeled with use equipment 1 and use equipment 2, are shown that are charged by the network 14, for example by the network device 18.

Each of the IoT devices 12 has an energy harvest window that takes place before a discontinuous reception time window and a paging occasion. In the shown embodiment, the respective energy harvest windows take place directly or immediately before the respective discontinuous reception time window and the paging occasion. In other words, an operation window of the IoT devices 12 directly takes place after charging.

Figure 4:
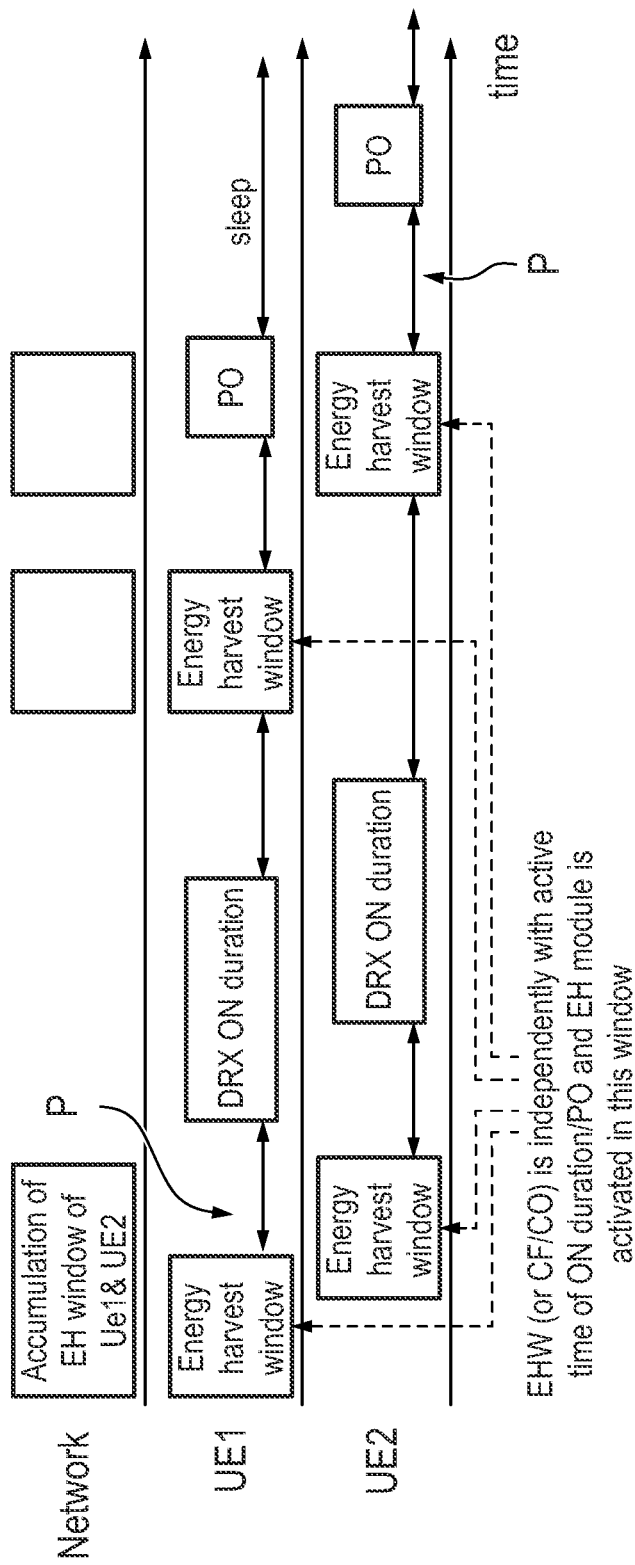

In FIGS. 3 and 4, different operation scenarios of the system 10 are illustrated with two IoT devices 12 in a schematic manner, for example energy harvest windows of the IoT device(s) 12 during which the IoT device(s) 12 can be charged, for example their respective energy storage 26.

In general, at least one energy harvest window for the internet-of-things device 12 is provided by the network 14 or the network device 18, during which energy provided by the network device 18, namely via the RF signal transmitted, is stored in the energy storage 26 in a wireless manner.

As shown in FIGS. 3 and 4, the energy harvest window takes place before a discontinuous reception ("DRX") time window and/or before a paging occasion ("PO").

Moreover, the respective energy harvest windows of the IoT devices 12 overlap partly in the time domain. Since the IoT devices 12 have to be charged, an energy transmission window of the network device 16 relates to an accumulation of the individual energy harvest windows of the IoT devices 12 as shown in FIGS. 3 and 4. In other words, the energy harvest windows for the IoT devices 12 are shorter than the energy transmission window of the network device 16.

Furthermore, both FIGS. 3 and 4 illustrate that the IoT devices 12, for example their charging modules 20, are deactivated most of the time ("sleep"). In addition to the deactivated time periods, the discontinuous reception ("DRX") time windows and the paging occasions relate to active times, wherein the energy harvest windows are passive times, as the IoT devices 12 are passively charged by receiving the RF signal(s). In some embodiments, the charging modules 20 are only activated so as to be enabled to convert the RF signal(s) to electrical energy to be stored in the energy storage(s) 26. In some of these embodiments, the charging modules 20 may include, for example, activation circuitry that activates upon reception of a RF signal, a clock signal, a communication signal, etc.

As shown in FIG. 3, two different kinds of energy harvest windows are provided for each IoT device 12, which are labelled with "A" and "B". In some embodiments, the different kinds of energy harvest windows depend on the subsequent activities, namely either the discontinuous reception ("DRX") time window or the paging occasion ("PO"). As illustrated in FIG. 3, the different kinds of energy harvest windows may differ with regard to the duration and the power. However, the frequency or the bandwidth may also be altered.

In general, each energy harvest window may be defined by duration, bandwidth, frequency and/or power, wherein the energy harvest windows, for example the different kinds of energy harvest windows, may differ with regard to the parameters and/or their values.

Furthermore, FIG. 3 shows that the energy harvest windows each take place immediately before the discontinuous reception ("DRX") time window and/or immediately before the paging occasion ("PO"). Accordingly, the at least one energy harvest window depends on the discontinuous reception time window and/or the paging occasion.

As shown in FIG. 3, the network 14 monitors the behavior of the IoT devices 12, namely the active times like the discontinuous reception ("DRX") time windows and the paging occasions ("PO"). Depending thereon, the radio frequency signals are transmitted that are used for charging the IoT devices 12 accordingly.

In FIG. 4, it is shown that a pause ("P") takes place between an energy harvest window and a subsequent operation of the IoT device 12, e.g. the discontinuous reception ("DRX") time window or the paging occasion ("PO"). Hence, the energy harvest window is independent with respect to an active time of the IoT device 12.

In contrast to the embodiment shown in FIG. 3, the network 14 does not monitor the behavior of the IoT devices 12, namely the active times like the discontinuous reception ("DRX") time windows and the paging occasions ("PO"), in order to transmit the radio frequency signals in dependency of the discontinuous reception ("DRX") time windows and the paging occasions ("PO"). Actually, charging occasions are monitored/determined during which the network 14, e.g. the network device 18, may transmit the radio frequency signals for charging the IoT devices 12.

Generally, the IoT device 12, for example its communication module 30, may have a clock that ensures that the charging module 20 wakes up during the energy harvest window such that the charging can be performed.

In some embodiments, the energy stored during the respective energy harvest window is sufficient for the subsequent activity of the IoT device 12, for instance a subsequent transmission. In some embodiments the information gathered by the sensor 36 may be transmitted during the subsequent transmission period.

Certain embodiments disclosed herein include components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of operating an internet-of-things (IoT) device, the method comprising the steps of:
   providing an internet-of-things device with an energy storage, and
   providing at least one energy harvest window for the internet-of-things device during which energy provided by a network device is stored in the energy storage in a wireless manner, wherein the energy harvest window takes place before a discontinuous reception time window and/or before a paging occasion.

2. The method according to claim 1, wherein the at least one energy harvest window is provided by a network to which the internet-of-things device and the network device are connected.

3. The method according to claim 1, wherein the at least one energy harvest window is defined by duration, bandwidth, frequency and/or power.

4. The method according to claim 1, wherein two different kinds of energy harvest windows are provided.

5. The method according to claim 4, wherein the different kinds of energy harvest windows are different with regard to duration, bandwidth, frequency and/or power.

6. The method according to claim 4, wherein a first kind of energy harvest window takes place before the discontinuous reception time window, and wherein a second kind of energy harvest window takes place before the paging occasion.

7. The method according to claim 1, wherein the at least one energy harvest window takes place immediately before the discontinuous reception time window and/or immediately before the paging occasion such that the at least one energy harvest window depends on the discontinuous reception time window and/or the paging occasion.

8. The method according to claim 1, wherein the at least one energy harvest window is independent of the discontinuous reception time window and/or the paging occasion.

9. The method according to claim 1, wherein a pause takes place between the at least one energy harvest window and the discontinuous reception time window and/or between the at least one energy harvest window and the paging occasion.

10. The method according to claim 1, wherein the at least one energy harvest window for the internet-of-things device is shorter than an energy transmission window of the network device.

11. The method according to claim 1, wherein the internet-of-things device has a communication circuit with a transmission part and/or a reception part.

12. The method according to claim 11, wherein the communication circuit has a clock capable of synchronizing the internet-of-things device to the at least one energy harvest window.

13. The method according to claim 11, wherein the internet-of-things device has a sensor that is coupled to the communication circuit.

14. The method according to claim 1, wherein the energy stored is sufficient for a subsequent transmission done by the internet-of-things device.

15. The method according to claim 1, wherein the energy storage is a capacitor or a battery.

16. The method according to claim 1, wherein the network device is a base station.

17. A system for operating an internet-of-things (IoT) device, wherein the system comprises a network, a network device as well as an internet-of-things device with an energy storage, wherein the network is configured to define at least one energy harvest window for the internet-of-things device during which energy provided by the network device is stored in the energy storage in a wireless manner, wherein the energy harvest window takes place before a discontinuous reception time window and/or before a paging occasion.

18. The system according to claim 17, wherein the internet-of-things device and the network device are embedded in the network such that the network device is configured to transmit a signal via the network to the internet-of-things device that is configured to receive the signal.

* * * * *